April 15, 1952 G. A. LYON 2,592,584
WHEEL STRUCTURE
Filed June 28, 1949
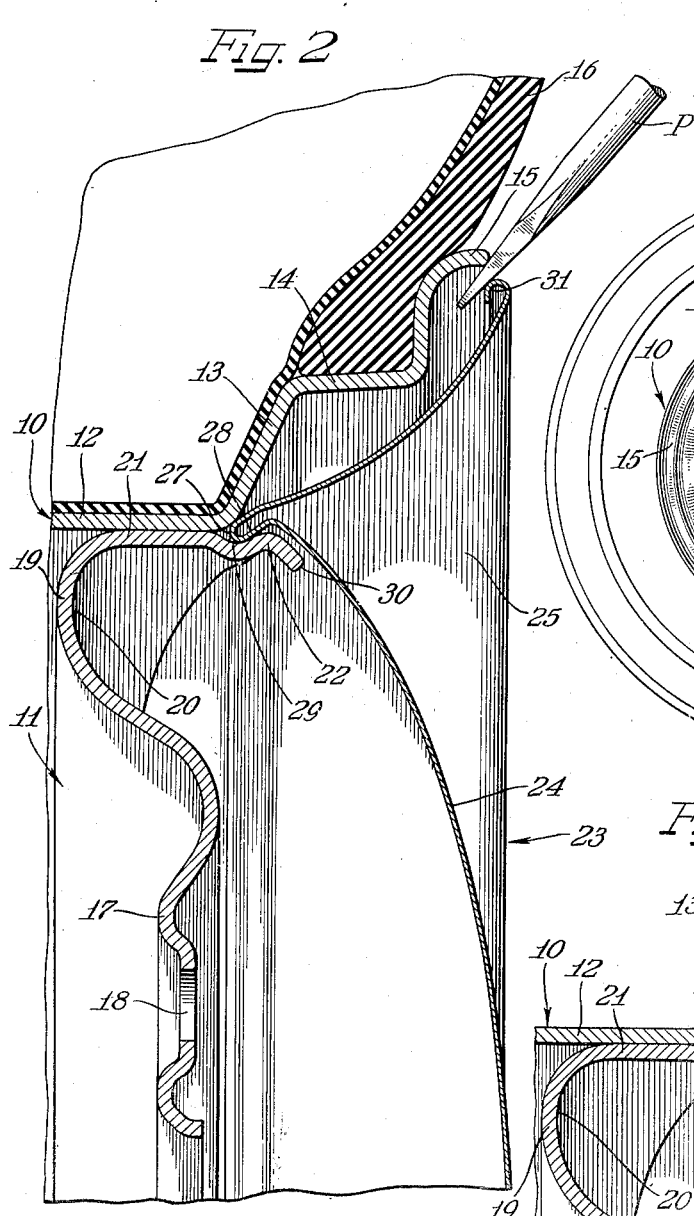
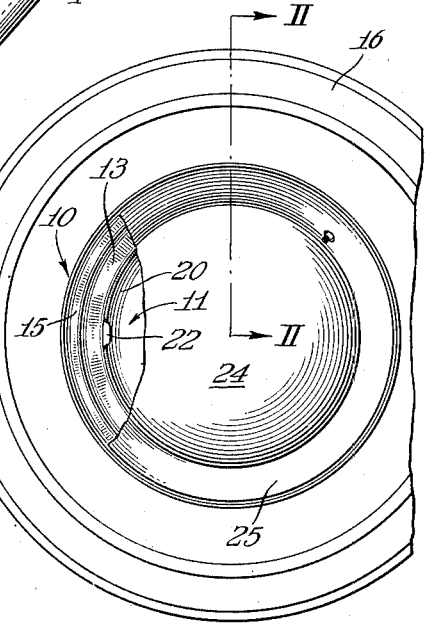
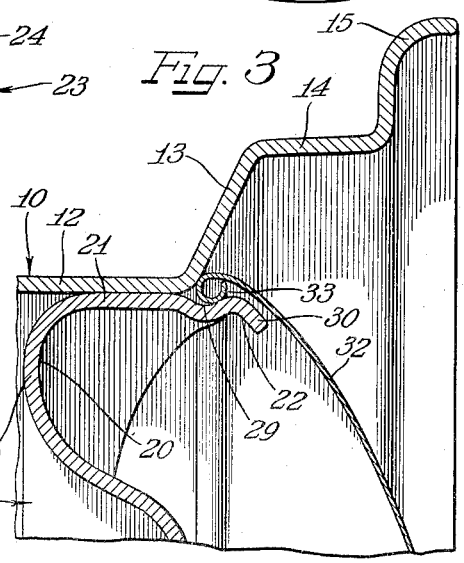
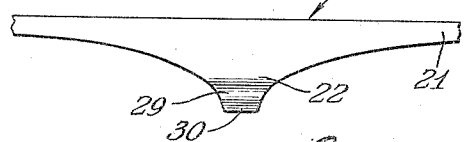
Inventor
George Albert Lyon Patented Apr. 15, 1952

2,592,584

UNITED STATES PATENT OFFICE 2,592,584

WHEEL STRUCTURE

George Albert Lyon, Detroit, Mich.

Application June 28, 1949, Serial No. 101,726

10 Claims. (Cl. 301—37)

1

The present invention relates to improvements in wheel structures and more particularly concerns an improved vehicle wheel structure in which the body of the wheel embodies a novel construction.

An important object of the present invention is to provide an improved wheel structure wherein the body portion of the wheel includes novel means for retaining a wheel cover.

Another object of the invention is to provide a novel wheel structure wherein a wheel body is attached to a tire rim, and the wheel body has means adjacent the junction thereof with the tire rim for attachment of a wheel cover in snap-on pry-off relation.

A further object of the invention is to provide a novel wheel body structure for a vehicle wheel.

According to the general features of the present invention there is provided in a wheel structure including a multi-flange tire rim having a base flange, a wheel body formed from a sheet metal stamping having at its outer periphery a plurality of generally axially outwardly extending cover retaining fingers, the outer periphery of the wheel body being secured to the base flange of the tire rim with said cover retaining extensions projecting axially outwardly beyond the outer margin of the base flange for retaining engagement by a wheel cover.

According to other general features of the invention there is provided in a wheel structure a body disk having the outer margin thereof formed with a concave annular channel providing a generally axially outwardly extending peripheral flange arranged to be attached to the base flange of a tire rim and having a plurality of cover retaining extensions thereon.

According to still further general features of the invention there is provided in a wheel structure including a multi-flange tire rim having a base flange and a side flange, a wheel body disk including an outer peripheral generally axially extending attachment flange structure secured to the base flange of the tire rim and having a plurality of axially outward cover retaining extensions, and a wheel cover including a generally axially inwardly extending annular retaining portion retainingly engaging said extensions and held by said extensions at the juncture of the tire rim and wheel body.

Other objects, features and advantages of the present invention will be readily apparent from the following detailed description of a preferred embodiment thereof taken in conjunction with the accompanying drawings, wherein:

2

Figure 1 is a side elevational view of a vehicle wheel embodying features of the present invention;

Figure 2 is an enlarged fragmentary radial sectional view taken on line II—II of Figure 1;

Figure 3 is a sectional view similar to Figure 2 but showing a modified form of cover applied to the wheel; and Figure 4 is a reduced scale edge elevational view of the wheel body of the wheel as it appears before assembly with the tire rim.

As shown on the drawings:

The present invention is especially adapted for use in automobile wheels including a multi-flange tire rim 10, which may be formed as a rolled section from appropriate gauge sheet metal, and a wheel body 11 which is preferably formed as a sheet metal stamping.

The tire rim 10 is preferably provided with a base flange 12, a side flange 13, intermediate flange 14 and a terminal flange 15, the flanges being correlated to provide a drop center rim for accommodating a pneumatic tire and tube assembly 16.

The wheel body 11 includes a central bolt-on flange 17 including bolt apertures 18 arranged to accommodate attachment bolts by which the wheel is attached to the axle portion of a vehicle (not shown). At its outer margin the wheel body 11 is formed with a generally axially inwardly projecting annular rib 19 of substantial radius providing a concave cross-section groove 20 and defined at its radially outer side by a generally axially outwardly extending attachment flange 21 which is secured in any appropriate fashion as by welding or the like to the base flange 12 of the tire rim.

It is customary to apply to the outer side of such a vehicle wheel a cover member such as a hub cap or full covering cover assembly or disk. In view of the modern trend toward smaller wheels and larger tires it has been found desirable to provide means adjacent the outer margin of the wheel body for attachment of the wheel cover.

According to the present invention the means for attachment of a wheel cover comprises means integral with the wheel body attachment flange 21. To this end, the attachment flange 21 is provided with a plurality of generally axially outward extensions or terminal fingers 22 of a length to project axially outwardly beyond the juncture of the tire rim base flange 12 and the side flange 13 of the tire rim. While in the drawings only one of the fingers 22 is shown, it will be understood that as many of such fingers may be provided as desired, a convenient arrangement comprising four of such fingers provided quadrantly around the wheel. In fact, it has been found quite advantageous to make the wheel body 11 from a square blank of material, with the corners turned out to provide the fingers 22. This affords a generally scalloped edge for the attachment flange 21 of the wheel body with the termini of the corners or scallops projecting axially outwardly and providing the cover retaining fingers.

In one form, as shown in Figure 2, a cover 23 is provided with a central large radius crowned portion 24 and a trim ring annulus 25 formed in one piece with the crown portion and extending convexly in a generally radially and axially outward direction from a generally axially inwardly and slightly radially inwardly turned juncture fold 27 dimensioned to fit at the juncture of the wheel body and the tire rim and more particularly at the shoulder provided by junction of the base and side flanges 12 and 13 of the tire rim. The fold 27 provides a generally axially outwardly and radially inwardly facing retaining shoulder 28 and is receptive within a groove 29 formed in each of the retaining fingers 22 and facing generally toward the tire rim. To facilitate application of the cover, each of the retaining fingers is preferably formed with a generally radially inwardly and axially outwardly extending cam tip or extremity 30. Thus, in applying the cover 23, it is generally centered with respect to the wheel with the reinforcing and retaining fold 27 engaging the cam tips 30 of the retaining finger extensions and the cover is then pushed axially inwardly so that the retaining fold 27 which is of substantial inherent resiliency will stretch and cam inwardly until the fold snaps into the retaining groove 29 of the finger and engages in wedging retained relation within the groove 29 of the finger and against the adjacent portion of the tire rim.

The trim ring portion 25 of the cover extends in substantial concealing relation to the outer side of the tire rim and has the outer margin thereof turned under to provide a reinforcing edge bead 31 opposite the extremity of the terminal flange 15 of the tire rim. When it is desired to remove the cover a pry-off tool P is inserted between the edge bead 31 and the terminal flange 15 and manipulated to pry the cover axially outwardly to release the retaining fold or flange 27 from the retaining engagement with the stiff retaining fingers 22 and more particularly to release the shoulder flange 28 of the cover from the opposing shoulder within the groove 29 of the finger by causing the shoulder flange 28 to cam past the finger shoulder responsive to the pry-off force.

In the modification of Figure 3, the wheel structure is identical with Figure 2 but a hub cap 32 is applied to the outer side of the wheel, the hub cap having a turned and beaded resilient edge 33 which is engaged in snap-on pry-off relation with the retaining fingers 22 of the wheel.

I claim as my invention:

1. In a wheel structure including a multiflange tire rim having a base flange, a wheel body formed from a sheet metal stamping having at its outer periphery a plurality of generally axially outwardly extending cover retaining extensions, the outer periphery of the wheel body being secured to the base flange of the tire rim with said cover retaining extensions projecting axially outwardly beyond the outer margin of the base flange for retaining engagement by a wheel cover.

2. In a wheel structure, a body disk having the outer margin thereof formed with a concave annular channel providing a generally axially outwardly extending peripheral flange arranged to be attached to the base flange of a tire rim and having a plurality of finger-like cover retaining extensions extending generally axially in one piece therefrom.

3. In a wheel structure including a multiflange tire rim having a base flange and a side flange, a wheel body disk including an outer peripheral generally axially extending attachment flange structure secured to the base flange of the tire rim and having a plurality of axially outward cover retaining extensions, and a wheel cover including a generally axially inwardly extending annular retaining portion retainingly engaging said extensions and held by said extensions at the juncture of the tire rim and wheel body.

4. In a wheel structure including a multiflange tire rim and a disk type wheel body, said body comprising a marginal flange secured to the tire rim and having integral axially outwardly extending cover retaining fingers, each of the cover retaining fingers having a radially outwardly opening groove closely adjacent to the tire rim, and a wheel cover having an axially inwardly and radially inwardly extending finger engaging formation engaging in snap-on pry-off relation within said groove and wedged within said groove and against the adjacent portion of the tire rim.

5. In a wheel structure including a multiflange tire rim and a disk type wheel body, said body comprising a marginal flange secured to the tire rim and having integral axially outwardly extending cover retaining fingers, each of the cover retaining fingers having a radially outwardly opening groove closely adjacent to the tire rim, and a wheel cover having an axially inwardly and radially inwardly extending finger engaging formation engaging in snap-on pry-off relation within said groove and wedged within said groove and against the adjacent portion of the tire rim, said wheel cover retaining formation comprising an intermediate generally inwardly extending integral fold intermediate and joining a central crowned portion and a radially outer trim ring portion.

6. In a wheel structure including a multiflange tire rim and a disk type wheel body, said body comprising a marginal flange secured to the tire rim and having integral axially outwardly extending cover retaining fingers, each of the cover retaining fingers having a radially outwardly opening groove closely adjacent to the tire rim, and a wheel cover having an axially inwardly and radially inwardly extending finger engaging formation engaging in snap-on pry-off relation within said groove and wedged within said groove and against the adjacent portion of the tire rim, said cover member comprising a hub cap and said retaining formation comprising an underturned resilient bead on the periphery of the hub cap.

7. In combination in a vehicle wheel construction, a tire rim having a base flange, and a wheel body stamping including a generally axially outwardly extending marginal flange secured to said base flange and having a substantially scalloped edge with the extremities of the scallops projecting beyond the outer edge of the base flange of the tire rim and providing wheel cover engaging fingers.

8. In combination in a vehicle wheel construction, a tire rim having a base flange, and a wheel body stamping including a generally axially outwardly extending marginal flange secured to said base and having a substantially scalloped edge with the extremities of the scallops projecting beyond the outer edge of the base flange of the tire rim and providing wheel cover engaging fingers, each of said fingers having a radially outwardly opening retaining groove adjacent to juncture of the fingers with the tire rim.

9. In combination in a vehicle wheel construction, a tire rim having a base flange, and a wheel body stamping including a generally axially outwardly extending marginal flange secured to said base and having a substantially scalloped edge with the extremities of the scallops projecting beyond the outer edge of the base flange of the tire rim and providing wheel cover engaging fingers, each of said fingers in addition having a cover-camming generally radially turned extremity.

10. In a wheel structure including a multi-flange tire rim including a base flange and a terminal flange, a wheel body comprising a metallic stamping having a generally axially outwardly turned attachment flange secured to the base flange of the tire rim and having axially outward cover retaining extensions thereon, a wheel cover substantially completely covering the outer side of the wheel and having a central crown portion and a trim ring portion, the juncture of the central crown portion and the trim ring portion comprising a generally axially and radially inwardly extending flange structure retainingly engaged with the retaining fingers and wedged thereby against the tire rim adjacent to the juncture of the fingers with the tire rim, the outer margin of the trim ring portion of the cover comprising a turned reinforcing edge opposite the terminal flange of the tire rim and adapted to be engaged by a pry-off tool for prying the cover free from said fingers.

GEORGE ALBERT LYON.

REFERENCES CITED

The following references are of record in the file of this patent:

UNITED STATES PATENTS

| Number | Name | Date |
|---|---|---|
| 1,461,690 | Torkelson et al. | July 10, 1923 |